United States Patent [19]

Wallace

[11] Patent Number: 5,574,987

[45] Date of Patent: Nov. 12, 1996

[54] ANTENNA SWITCHING APPARATUS

[75] Inventor: Raymond C. Wallace, San Diego, Calif.

[73] Assignee: Qualcomm Incorporated, San Diego, Calif.

[21] Appl. No.: 363,422

[22] Filed: Dec. 20, 1994

[51] Int. Cl.$^6$ .................................................. H04B 1/18
[52] U.S. Cl. ............................ 455/82; 455/89; 455/129; 455/277.1; 455/292
[58] Field of Search ................................ 485/80, 82, 83, 485/89, 127, 129, 277.1, 278.1, 279.1, 281, 283, 292; 333/103, 262; 343/702

[56] References Cited

U.S. PATENT DOCUMENTS

| 4,397,041 | 8/1983 | Takeda et al. | 455/277.1 |
| 4,803,447 | 2/1989 | Schultz et al. | 455/277.1 |
| 5,261,121 | 11/1993 | Hashimoto | 455/277.1 |

*Primary Examiner*—Chi H. Pham
*Attorney, Agent, or Firm*—Russell B. Miller; Roger W. Martin

[57] ABSTRACT

The antenna switch of the present invention switches from a portable radio's internal antenna to an external, vehicle adapter antenna. The second antenna is part of the vehicle adapter that supplies DC power to the vehicle adapter. A ¼-wavelength transformer couples the internal antenna to the portable radio's transceiver. Diodes couple transformer and antenna to ground. A ½-wavelength transformer couples the vehicle adapter to the transceiver. When the portable radio is connected to the vehicle adapter, DC power is supplied to the diodes causing them to appear as a short thus making the first transformer appear as an open circuit. This causes a signal from the transceiver to be conducted to the second antenna on the vehicle adapter.

5 Claims, 2 Drawing Sheets

ANTENNA SWITCHING APPARATUS

BACKGROUND OF THE INVENTION

1. Field of the Invention

The present invention relates to communications. More particularly, the present invention relates to switching between two antennas.

2. Description of the Related Art

Radiotelephones can be of the portable type that use a small battery to power the radiotelephone. These units typically operate at a low power output due to the limited power output of the battery. The limited battery life is a trade-off to obtain a smaller, more portable radiotelephone.

Mobile radiotelephones are typically powered by a vehicle's electrical system. This enables the mobile radiotelephone to operate at a higher power output since battery output is not a concern. The drawback of the mobile is the lack of portability. The mobile is typically required to remain connected to the vehicle.

Vehicle adapter kits have been developed giving portable radiotelephones the benefits of mobile radiotelephones. The portable is connected to the vehicle adapter kit when the user is in the vehicle. This connection allows the portable to be powered by the vehicle electrical system.

Additionally, when the portable radiotelephone is connected to the vehicle adapter, the mobile's antenna is used due to its higher gain and better placement above the vehicle. In order to accomplish this, the coupling of the portable to the vehicle adapter must also switch from communicating with the portable antenna to using the mobile antenna.

This switching from one antenna to the other is accomplished by a solid state relay in the portable radiotelephone. When the portable is connected to the vehicle adapter, the relay is energized and switched such that the portable's antenna is switched out and the vehicle's antenna is switched in. This allows the portable's transceiver to communicate over the vehicle antenna.

This relay, however, increases the noise figure of the radiotelephone's front end. This results in increased distortion to the signals being communicated with a resulting loss of data or voice. There is a resulting need for a way to switch from a portable's internal antenna to the vehicle antenna without causing distortion of transmitted and received signals.

SUMMARY OF THE INVENTION

The present invention encompasses an apparatus for switching between a first antenna and a second antenna of a radio communications system. The system has a transceiver that communicates radio signals that have a predetermined signal wavelength. A first transformer, having a first predetermined wavelength, couples the first antenna to the transceiver. A second transformer, having a second predetermined wavelength, couples the second antenna to the transceiver. At least one diode couples the first transformer and the first antenna to a ground potential.

In the preferred embodiment, the second antenna is part of a vehicle adapter that supplies DC power to vehicle adapter and the second antenna is part of a portable radio. When the portable radio is coupled to the vehicle adapter, the vehicle adapter supplies the DC power to the diodes causing them to appear as a short, which makes the first transformer appear as an open circuit. This causes a signal from the transceiver to be conducted to the second antenna on the vehicle adapter.

DETAILED DESCRIPTION OF THE PREFERRED EMBODIMENT

Figure 1:
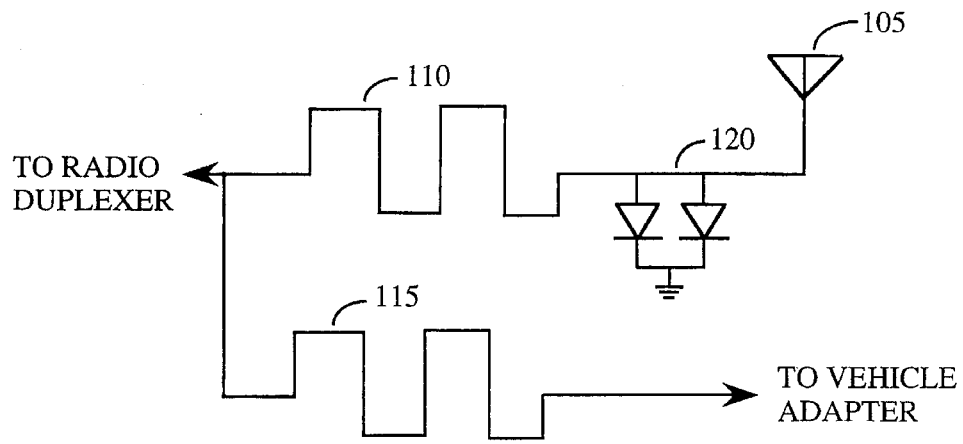
FIG. 1 shows a schematic diagram of the antenna switch of the present invention.

The antenna switching apparatus of the present invention is illustrated in FIG. 1. The apparatus is comprised of a ¼-wavelength transformer (110) that is coupled to the radio's transceiver circuitry. This transformer (110) is responsible for conducting the signals to and from the duplexer as will be seen later. The ¼-wavelength transformer (110) is also connected to the radio's antenna (105). This connection allows the transformer (110) to conduct the received and transmitted signals between the radio's internal antenna (105) and the transceiver circuitry when the radio is not connected to the vehicle adapter.

Diodes (120) are connected to the node between the ¼-wavelength transformer (110) and the antenna (105). The diode's (120) anode is connected to the node while the cathode is connected to the radio's ground plane. In the preferred embodiment, two PIN diodes are used. In alternate embodiments, different diode types are used and different quantities of diodes are used.

A ½-wavelength (115) transformer is connected to the node between the ¼-wavelength transformer (110) and the duplexer. This transformer (115) connects the external antenna of the vehicle adapter with the duplexer, thus enabling the radio to communicate over the external antenna when the radio is connected to the vehicle adapter. The vehicle adapter also provides the DC power required by the radio to operate, taking the power burden off the radio's battery.

When the radio is operating separately from the vehicle adapter, the diodes (120) are turned off since there is no power going to them. In their off state the diodes (120) act as a high impedance. The high impedance causes the ¼-wavelength transformer (110) to act as a short circuit, thus allowing the signals from the transceiver circuitry to be transmitted through the ¼-wavelength transformer (110) to the antenna (105) and vice versa.

When the radio is connected to the vehicle adapter, the 12V DC power from the vehicle's electrical system is conducted through both transformers (115) and (110) to the diodes (120). This turns the diodes (120) on, thus making them look like a short circuit. This change in impedance makes the ¼-wavelength transformer (110) look like an open circuit to the transceiver circuitry. The signals transmitted from the radio will then be conducted through the ½-wavelength transformer (115) to the external antenna.

Figure 2:
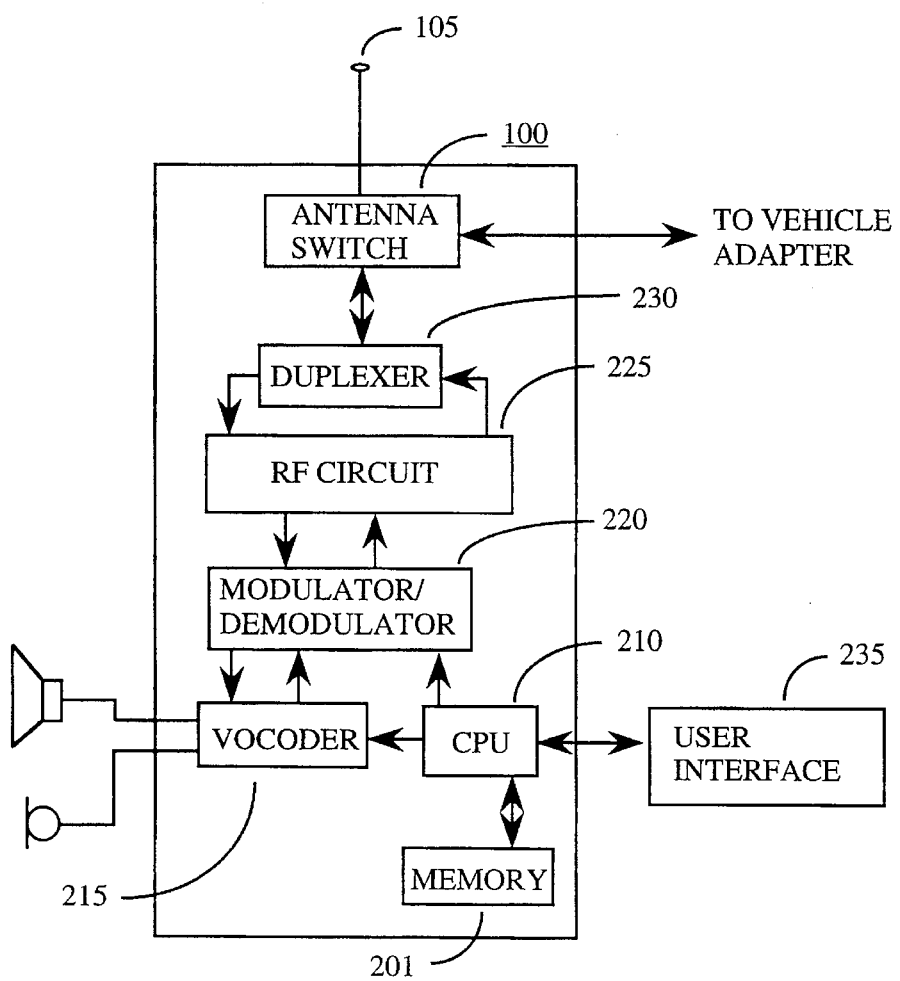
FIG. 2 shows a block diagram of a typical radiotelephone in accordance with the present invention.

A typical radio of the present invention is illustrated in FIG. 2. The radio is comprised of memory (201) for storing radio data such as telephone numbers and alphanumeric data. In the preferred embodiment, this memory (201) is nonvolatile random access memory (RAM). The radio also consists of processor (210) to control the radio, a vocoder (215) to encode and decode the user's voice, a modulation/ demodulation circuit (220), and the radio frequency electronics (225) that convert the modulated signals to higher frequencies for transmission and received signals to lower frequencies. The duplexer (230) interfaces the transmit and receive circuitry of the RF circuit (225) to the antenna (105).

Figure 3:
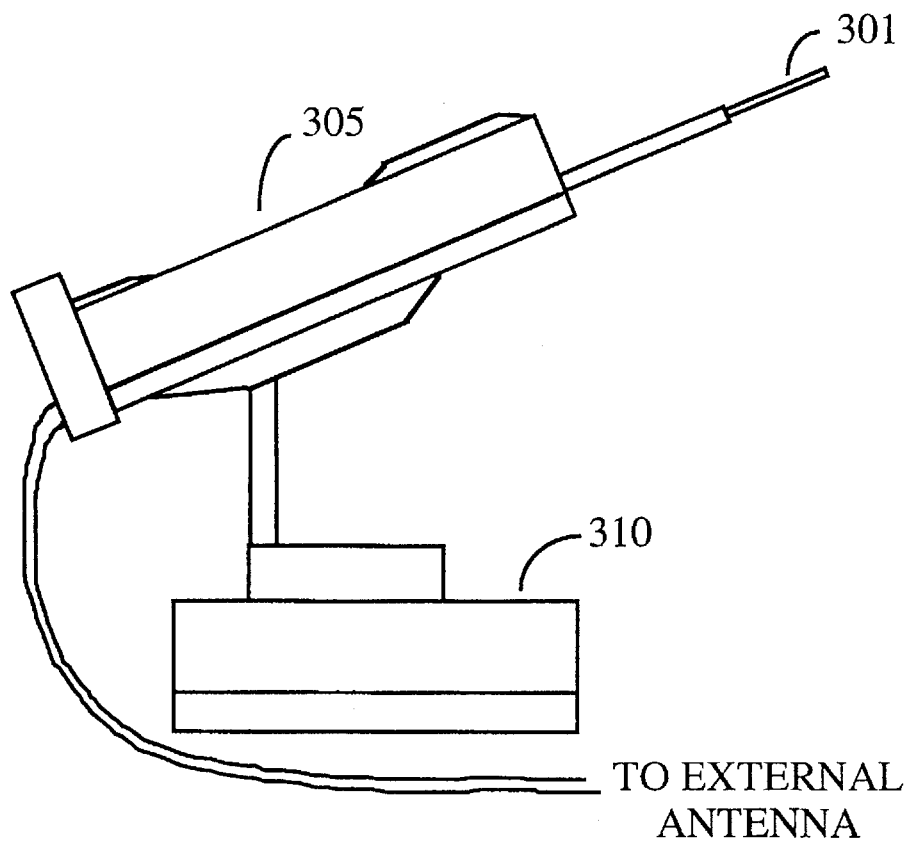
FIG. 3 shows a block diagram of a typical vehicle adapter with an external antenna.

A typical vehicle adapter of the present invention is illustrated in FIG. 3. This adapter is mounted in the vehicle with the antenna mounted externally on the vehicle. The portable radiotelephone (305) is held in a position that allows easy access to the user. The cradle (310) supplies power to the radiotelephone (305) from the car's battery to conserve the energy in the radiotelephone's battery. The present invention uses the presence of external power to switch the antenna from internal (301) to an external antenna by means already discussed above. The cradle (310) can also provide an external microphone and speaker to allow the caller to use the radiotelephone (305) without having to place the radiotelephone (305) close to the head.

I claim:

1. An apparatus for switching between a first antenna and a second antenna of a radio communications system, the system having a transceiver that communicates radio signals having a predetermined signal wavelength, the apparatus comprising:

a first transformer having a first predetermined wavelength, the first transformer coupling the first antenna to the transceiver;

a second transformer having a second predetermined wavelength, the second transformer coupling the second antenna to the transceiver, and being directly connected to said transceiver; and at least one diode coupling the first transformer and the first antenna to a ground potential.

2. The apparatus of claim 1 wherein the first predetermined wavelength is ¼ of the predetermined wavelength and the second wavelength is ½ of the predetermined signal wavelength.

3. The apparatus of claim 1 and further including the second antenna being coupled to a vehicle powered adapter.

4. The apparatus of claim 3 wherein the vehicle power adapter provides a sufficient DC voltage to turn on the at least one diode.

5. An antenna switching apparatus for switching between a first antenna in a portable radio and a second antenna in a vehicle adapter, the portable radio having a transceiver that communicates radio signals having a predetermined signal wavelength, the vehicle adapter having a DC voltage, the apparatus comprising:

a first transformer having a first predetermined wavelength, the first transformer coupling the first antenna to the transceiver;

a plurality of diodes coupling the first transformer and the first antenna to a ground potential; and a second transformer having a second predetermined wavelength, the second transformer coupling the vehicle adapter to the transceiver and the first transformer such that the DC voltage is coupled to the plurality of diodes, said second transformer being directly connected to said transceiver.

* * * * *